US012265382B2

(12) United States Patent
Peterson et al.

(10) Patent No.: US 12,265,382 B2
(45) Date of Patent: Apr. 1, 2025

(54) B vs W TWO PACK CONFIRMATION TEST

(71) Applicant: Shainin II LLC, Northville, MI (US)

(72) Inventors: Matthew Peterson, Easley, SC (US); Craig Hysong, Saline, MI (US)

(73) Assignee: SHAININ II LLC, Northville, MI (US)

( * ) Notice: Subject to any disclaimer, the term of this patent is extended or adjusted under 35 U.S.C. 154(b) by 272 days.

(21) Appl. No.: 17/820,622

(22) Filed: Aug. 18, 2022

(65) Prior Publication Data

US 2024/0061414 A1 Feb. 22, 2024

(51) Int. Cl.
*G05B 23/02* (2006.01)
*G06F 3/0484* (2022.01)

(52) U.S. Cl.
CPC ...... *G05B 23/0251* (2013.01); *G05B 2223/02* (2018.08); *G06F 3/0484* (2013.01)

(58) Field of Classification Search
CPC ............ G05B 23/0251; G05B 2223/02; G05B 23/0216; G06F 3/0484
See application file for complete search history.

(56) References Cited

U.S. PATENT DOCUMENTS

| | | | |
|---|---|---|---|
| 7,003,368 B2 * | 2/2006 | Koike | G05B 19/41865 700/121 |
| 2008/0221944 A1 * | 9/2008 | Kelly | G06Q 50/00 705/7.28 |
| 2021/0157312 A1 * | 5/2021 | Cella | G01M 13/045 |
| 2022/0108262 A1 * | 4/2022 | Cella | G05B 17/02 |

OTHER PUBLICATIONS

Kiemele, Mark, Fundamental Statistical Concepts and Methods Needed in a Test-and-Evaluator's Toolkit, Air Academy Associates, presented at ITEA 2010 Symposium Sep. 13, 2010, 43 pages.
Tukey, John W., A Quick, Compact, Two-Sample Test to Duckworth's Specifications*, Technometrics, vol. 1, No. 1, Princeton University, Feb. 1959, 19 pages.
Shainin II LLC, Red X Tracker software user interface screenshot with Six Pack test, 2019, 1 page.
Brainerd, Steve, ECE-580-DOE: Statistical Process Control and Design of Experiments, Oregon Health Sciences University—Oregon Graduate Institute, available online at https://myplace.frontier.com/~stevebrainerd1/STATISTICS/ECE-580-DOE%20WEEK%204_files/B_Vs_C_Test.pdf, Jan. 1, 2003, 7 pages.

* cited by examiner

*Primary Examiner* — Tung S Lau

(74) *Attorney, Agent, or Firm* — Stoel Rives LLP

(57) ABSTRACT

Disclosed is a parametric B vs W two pack confirmation test. The test entails receiving a desired alpha risk and output sample data, processing the output sample data to generate an estimated distribution of the output variable for the population of workpieces, determining bins of equal probability in the estimated distribution to define best-of-best (BOB) and worst-of-worst (WOW) regions based on the desired alpha risk, receiving B and W samples predicted to be within, respectfully, the BOB and WOW regions, and determining whether the B sample falls in the BOB region and the W sample falls within the WOW region.

9 Claims, 19 Drawing Sheets

Fig. 9

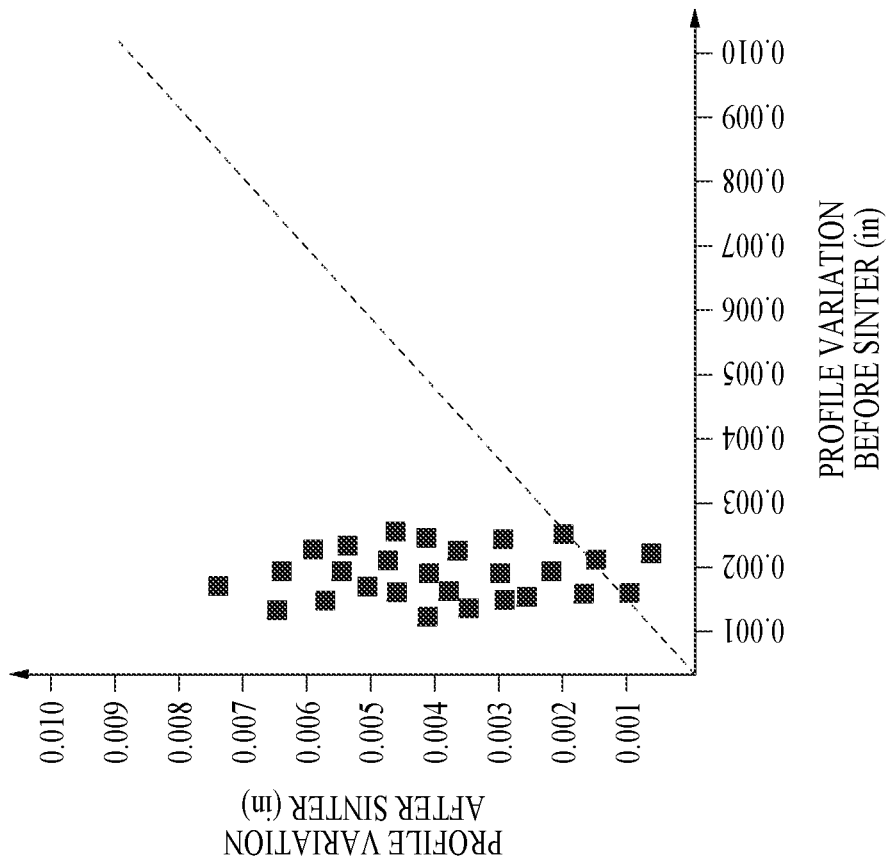
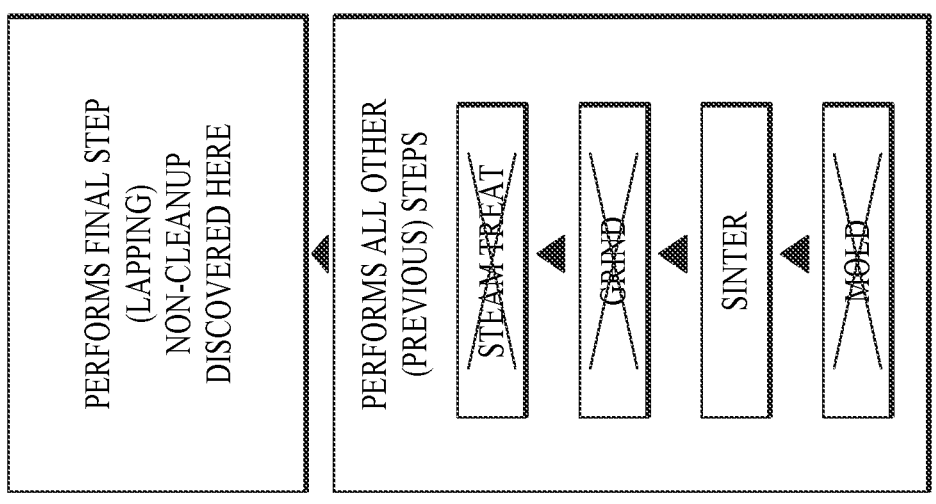
Fig. 15

Figure 18:
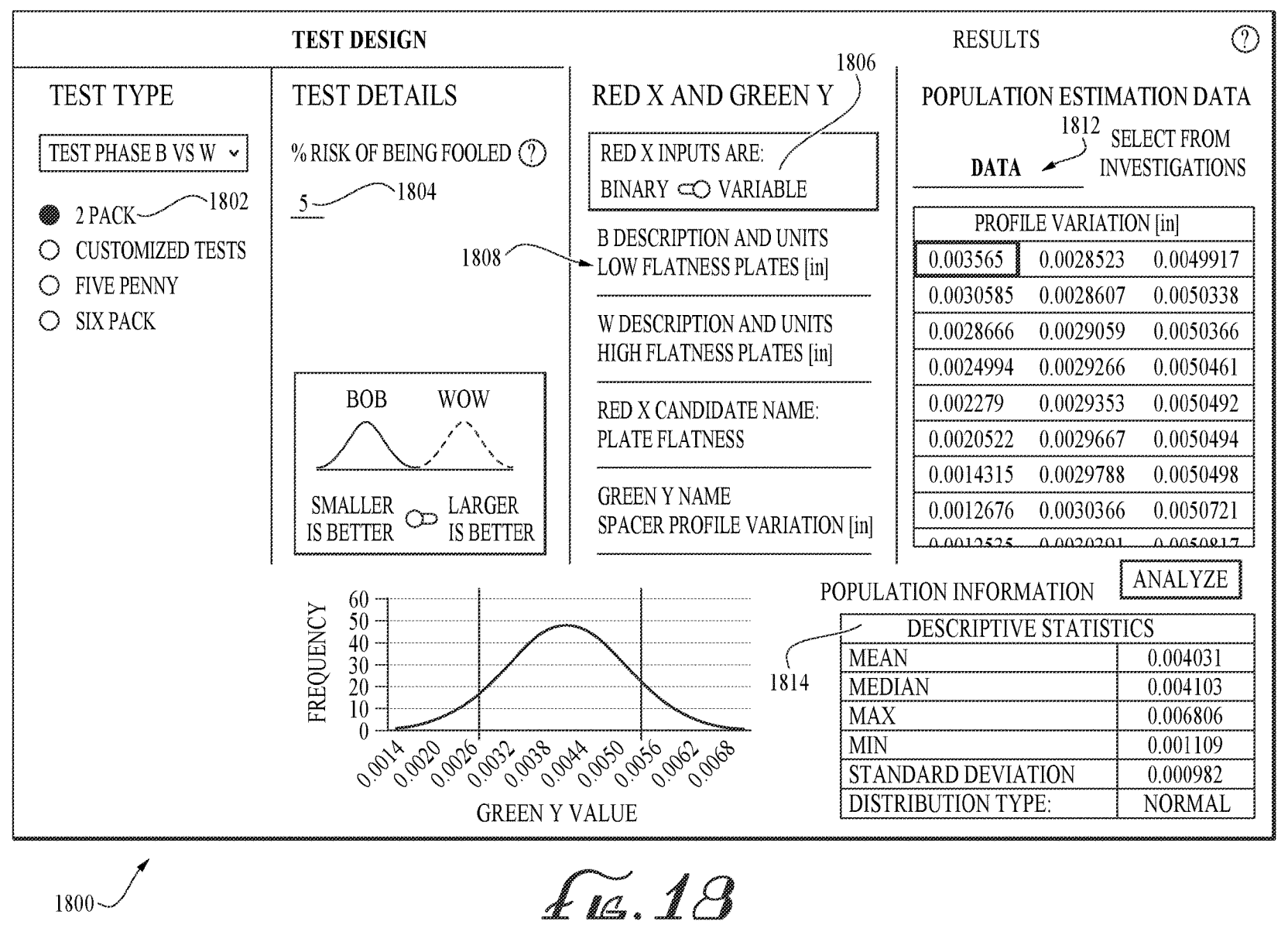

TEST DESIGN

TEST TYPE

TEST PHASE B VS W ▼ — 1802

- ● 2 PACK
- ○ CUSTOMIZED TESTS
- ○ FIVE PENNY
- ○ SIX PACK

TEST DETAILS

% RISK OF BEING FOOLED ⓘ — 1804

5

BOB    WOW

SMALLER   LARGER
IS BETTER   IS BETTER

RED X AND GREEN Y — 1806

RED X INPUTS ARE:
BINARY ⇄ VARIABLE

B DESCRIPTION AND UNITS
LOW FLATNESS PLATES [in]

1808

W DESCRIPTION AND UNITS
HIGH FLATNESS PLATES [in]

RED X CANDIDATE NAME:
PLATE FLATNESS

GREEN Y NAME
SPACER PROFILE VARIATION [in]

RESULTS

POPULATION ESTIMATION DATA

1812 — SELECT FROM
DATA    INVESTIGATIONS

| PROFILE VARIATION [in] | | |
|---|---|---|
| 0.003565 | 0.0028523 | 0.0049917 |
| 0.0030585 | 0.0028607 | 0.0050338 |
| 0.0028666 | 0.0029059 | 0.0050366 |
| 0.0024994 | 0.0029266 | 0.0050461 |
| 0.002279 | 0.0029353 | 0.0050492 |
| 0.0020522 | 0.0029667 | 0.0050494 |
| 0.0014315 | 0.0029788 | 0.0050498 |
| 0.0012676 | 0.0030366 | 0.0050721 |

POPULATION INFORMATION — 1814

| DESCRIPTIVE STATISTICS | |
|---|---|
| MEAN | 0.004031 |
| MEDIAN | 0.004103 |
| MAX | 0.006806 |
| MIN | 0.001109 |
| STANDARD DEVIATION | 0.000982 |
| DISTRIBUTION TYPE: | NORMAL |

[ANALYZE]

FREQUENCY (0, 10, 20, 30, 40, 50, 60) vs GREEN Y VALUE (0.0014, 0.0020, 0.0026, 0.0032, 0.0038, 0.0044, 0.0050, 0.0056, 0.0062, 0.0068)

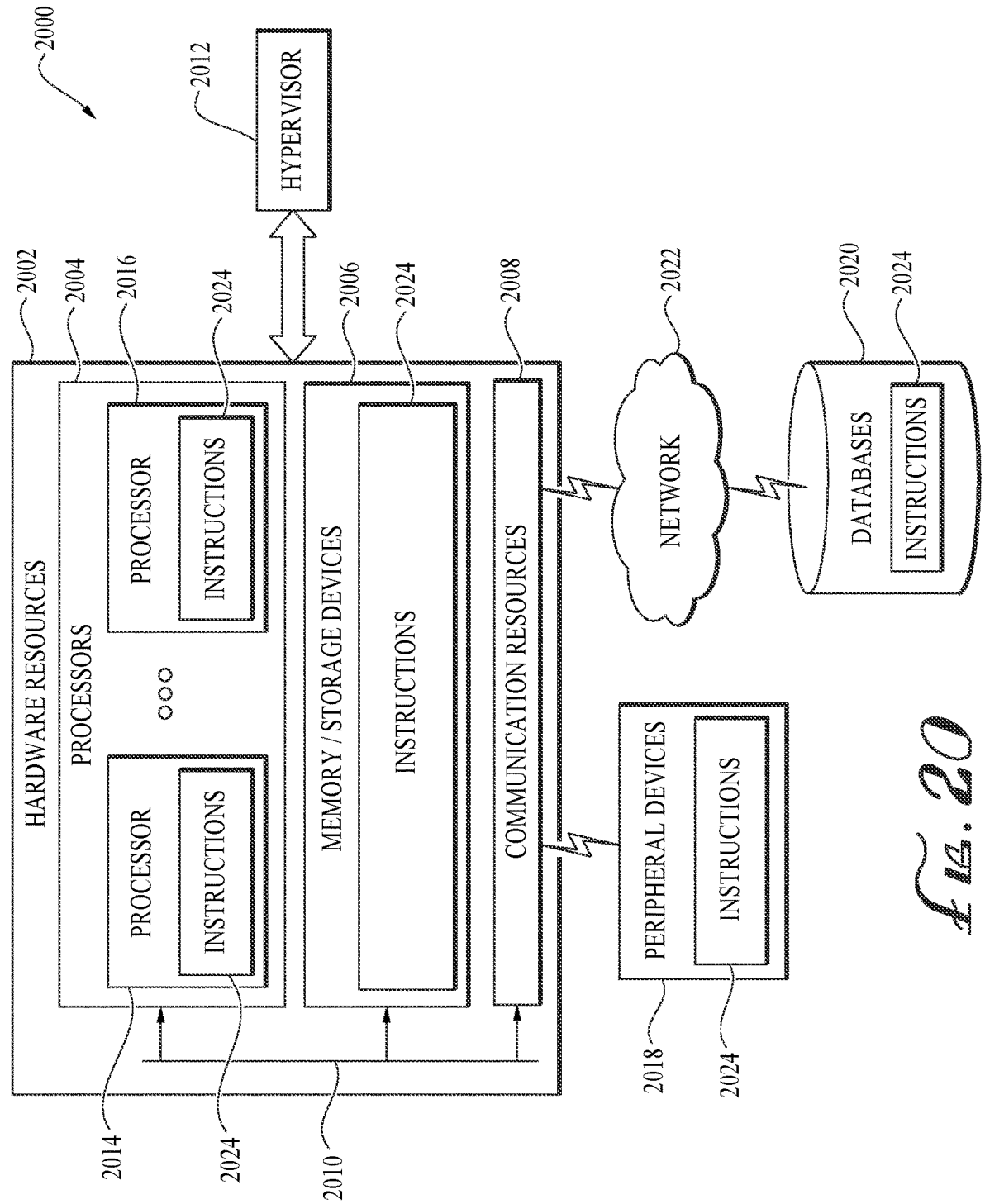

B vs W TWO PACK CONFIRMATION TEST

BACKGROUND INFORMATION

To increase reliability of products, problems arising during manufacture or operation of parts and products need to be identified, the root cause of those problems should be determined, and the problem may then be addressed. In this regard, loss causation mode and root cause analysis methods, such as fishbone diagram, Shainin Red X® process, why-why analysis, failure tree analysis, and other techniques, have been used in various industries.

The Shainin Red X process begins with an assumption that there is a predominant root cause for the problem. And the problem is observed with a Green Y® variable representing a material property, feature, defect, or event. The goal, therefore, is to find that root cause and analyze it. The subsequent solution then flows from that analysis. Tools developed by Shainin LLC include component search methods, paired comparison methods, product/process search, and B vs C six pack confirmation tests.

In general, confirmation testing is a useful step in solving a complex problem. Confirmation testing may be met with resistance in the following two scenarios: the confidence (and corresponding risk) of the test are not clearly defined and easy-to-understand; or the number of samples needed is too large, and thus too costly, either in time or resources.

SUMMARY OF THE DISCLOSURE

Disclosed is a method of structuring and performing, with a graphical user interface (GUI), a parametric B vs W two pack confirmation test for analyzing whether a test parameter is a cause of an observable problem. In an Example 1, the method comprises: receiving, via the GUI, an indication of a desired alpha risk and output sample data, the output sample data representing a population of workpieces subject to the observable problem, and each output sample in the output sample data having an associated measured value of an output variable that is representative of the observable problem; processing the output sample data to generate an estimated distribution of the output variable for the population of workpieces; determining bins of equal probability in the estimated distribution to define best-of-best (BOB) and worst-of-worst (WOW) regions based on the desired alpha risk; receiving, via the GUI, a B sample and a W sample predicted to be within, respectfully, the BOB and WOW regions, the B sample including a first measured value of the output variable and a second measured value of the test parameter, the W sample including a third measured value of the output variable and a fourth measured value of the test parameter; and determining whether the B sample falls in the BOB region and the W sample falls within the WOW region to indicate on the GUI that the parametric B vs W two pack confirmation test passed with the desired alpha risk.

Example 2: The method of Example 1, further comprising determining whether the output sample data represents a normally distributed population based on equally probable bins for chi square goodness of fit test.

Example 3: The method of Example 2, in which, in response to determining the output sample data does not represent the normally distributed population, the method further comprises determining whether the output sample data represents a Weibull distributed population based on estimated Weibull distribution parameters.

Example 4: The method of Example 3, further comprising iterating the estimated Weibull distribution parameters.

Example 5: The method of Example 1, in which the BOB and WOW regions are defined based on threshold values corresponding to bins at tails of the estimated distribution.

Example 6: The method of Example 1, further comprising calculating descriptive statistics of the estimated distribution to determine the threshold values.

Example 7: The method of Example 1, further comprising receiving, via the GUI, an indication that the BOB region corresponds to a low value of the output variable.

Example 8: The method of Example 1, further comprising receiving, via the GUI, an indication that the test parameter is a binary parameter.

Example 9: The method of Example 1, further comprising receiving, via the GUI, an indication that the test parameter is a variable parameter.

Also disclosed is a non-transitory computer-readable storage medium for a computer device having a graphical user interface (GUI). In an Example 10, the computer-readable storage medium includes instructions for configuring the computer device for structuring and performing, with the GUI, a parametric B vs W two pack confirmation test for analyzing whether a test parameter is a cause of a problem in a manufacturing process. The instructions, when executed by the computer device, cause the computer device to: receive, via the GUI, an indication of a desired alpha risk and output sample data, the output sample data representing a population of workpieces subject to the observable problem, and each output sample in the output sample data having an associated measured value of an output variable that is representative of the observable problem; process the output sample data to generate an estimated distribution of the output variable for the population of workpieces; determine bins of equal probability in the estimated distribution to define best-of-best (BOB) and worst-of-worst (WOW) regions based on the desired alpha risk; receive via the GUI, a B sample and a W sample predicted to be within, respectfully, the BOB and WOW regions, the B sample including a first measured value of the output variable and a second measured value of the test parameter, the W sample including a third measured value of the output variable and a fourth measured value of the test parameter; and determine whether the B sample falls in the BOB region and the W sample falls within the WOW region to indicate on the GUI that the parametric B vs W two pack confirmation test passed with the desired alpha risk.

Example 11: The non-transitory computer-readable storage medium of Example 10, in which the instructions further configure the computer device to determine whether the output sample data represents a normally distributed population based on equally probable bins for chi square goodness of fit test.

Example 12: The non-transitory computer-readable storage medium of Example 11, in which the instructions further configure the computer device to, in response to determination that the output sample data does not represent the normally distributed population, determine whether the output sample data represents a Weibull distributed population based on estimated Weibull distribution parameters.

Example 13: The non-transitory computer-readable storage medium of Example 12, in which the instructions further configure the computer device to iterate the estimated Weibull distribution parameters.

Example 14: The non-transitory computer-readable storage medium of Example 10, in which the BOB and WOW regions are defined based on threshold values corresponding to bins at tails of the estimated distribution.

Example 15: The non-transitory computer-readable storage medium of Example 10, in the instructions further configure the computer device to calculate descriptive statistics of the estimated distribution to determine the threshold values.

Example 16: The non-transitory computer-readable storage medium of Example 10, in which the instructions further configure the computer device to receive, via the GUI, an indication that the BOB region corresponds to a low value of the output variable.

Example 17: The non-transitory computer-readable storage medium of Example 10, in which the instructions further configure the computer device to receive, via the GUI, an indication that the test parameter is a binary parameter.

Example 18: The non-transitory computer-readable storage medium of Example 10, in which the instructions further configure the computer device to receive, via the GUI, an indication that the test parameter is a variable parameter.

The disclosed B vs W two pack confirmation test leverages the fact that in modern manufacturing, significant data exists, which may be used to accurately model the population of interest. The confidence of the test is based on the estimation of the population, not the test samples. This is a parametric test, as it leverages some understanding of the population being sampled.

The disclosed embodiments provide a B vs W two pack confirmation test method that, in some embodiments, has less than or equal to 5% alpha risk with a sample size less than five. In some embodiments, the B vs W two pack confirmation test is presented on a GUI to clearly state the assumptions and conditions met when applying such a test.

Additional aspects and advantages will be apparent from the following detailed description of embodiments, which proceeds with reference to the accompanying drawings.

BRIEF DESCRIPTION OF THE DRAWING FIGURES

To easily identify the discussion of any particular element or act, the most significant digit or digits in a reference number refer to the figure number in which that element is first introduced.

FIG. 9 is a table showing scale and shape modifiers for iterating Weibull parameters, according to one embodiment.

FIG. 15 is a block diagram and scatter plot showing a root cause for profile variation, according to one embodiment.

FIG. 18 is a GUI screenshot showing configuration of the B vs W two pack confirmation test, according to one embodiment.

FIG. 20 is a block diagram of components for performing processes described in this disclosure, according to one embodiment.

DETAILED DESCRIPTION OF EMBODIMENTS

Figure 1:
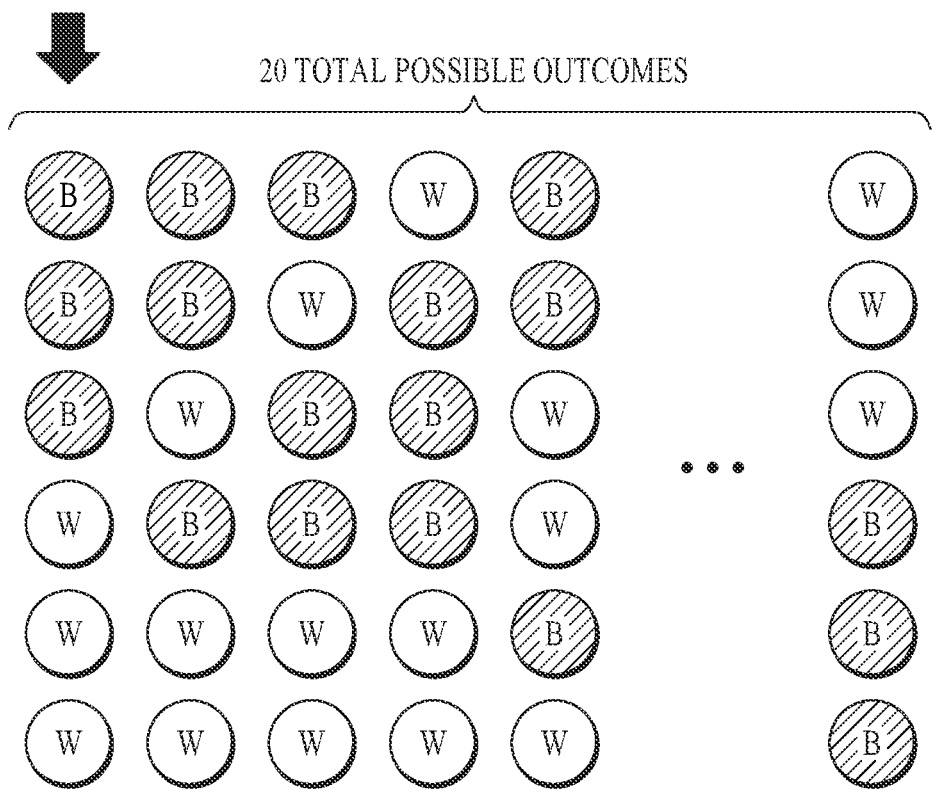
FIG. 1 is an annotated set of sample data showing an application of a B vs W six pack confirmation test, according to the prior art.

Existing confirmation tests include the B vs W six pack confirmation test, which is one of the most used tests for confirming a root cause of an observable problem. As the name suggests, and as shown in FIG. 1, the B vs W six pack confirmation test requires six sample parts. The test is non-parametric, meaning no understanding of the population being sampled is required. The test builds confidence by controlling the number of test samples. An end count is used to determine whether the test has succeeded or failed to confirm the Red X to Green Y relationship. The alpha risk associated with the test is based on the total number of possible outcomes and the number of those that would yield a false positive.

The risk for all of the conventional B vs W type tests is calculated in the same way. Risk values for current B vs W type confirmation tests range from 10% to 0.1%. These types of tests may be used with symmetric and asymmetric populations, with specialized tests for asymmetric populations (e.g., Spike B vs W or Barrier B vs C). The sample sizes for these tests range from: a minimum of five (with corresponding risk at 10%) to a maximum of 19 (for a symmetric, one tailed test, corresponding risk of 0.1%).

The conventional confirmation tests offer some advantages since they are non-parametric (no descriptive statistics or estimation of a larger population are required), they use relatively small sample sizes for the corresponding levels of risk, and they provide an easy-to-understand method for calculating alpha risk. In terms of shortcomings, however, the conventional tests provide no way to test with 10% or less alpha risk and fewer than five samples. They also provide no way to apply information about the population of interest, if it does exist.

Figure 2:
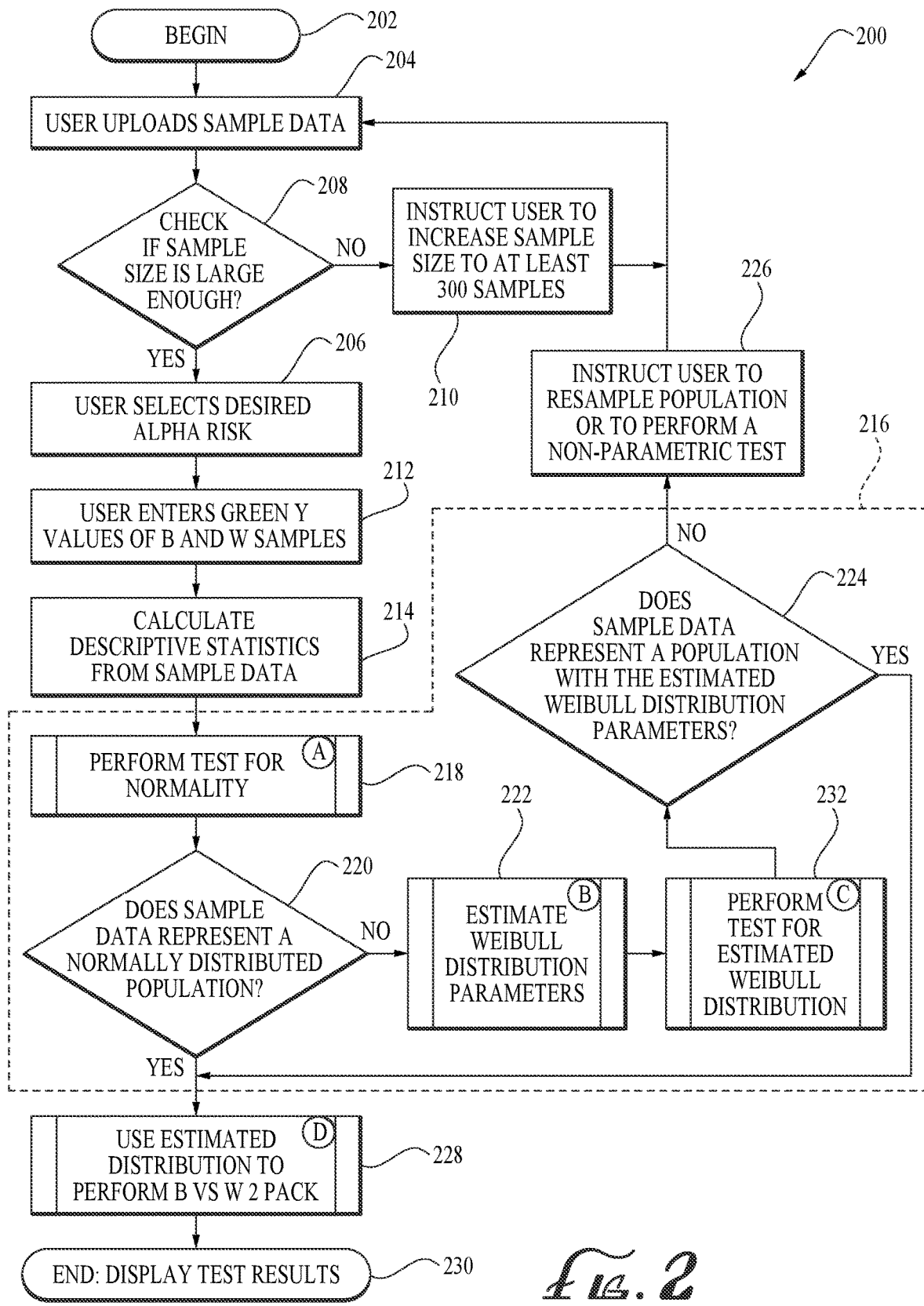
FIG. 2 is a flow chart of a process for performing a B vs W two pack confirmation test, according to one embodiment.

FIG. 2 shows a process 200 for performing a B vs W two pack confirmation test designed to analyze whether a test parameter is a cause of an observable problem. For instance, the observable problem could be a manufacturing tolerance issue, a design issue in new product development, a field reliability problem, or other type of problem.

Initially, process 200 begins by a user launching 202 an application for performing process 200, according to some embodiments. For instance, a desktop or mobile software application presents on a display a GUI that guides the user in performing process 200. An example GUI is described later with reference to FIG. 17-FIG. 19.

The user starts process 200 by uploading 204 output sample data. The output sample data represents a population of workpieces subject to the observable problem, as explained later by way of an example fuel injector spacer (see, e.g., FIG. 11-FIG. 16). Each output sample in the output sample data has an associated measured value of an output variable (also referred to as the Green Y variable) that is representative of the observable problem.

In other embodiments, the user can start process 200 by selecting 206 a desired alpha risk before he or she uploads the output sample data. In either scenario, process 200 entails receiving (e.g., via the GUI) an indication of the desired alpha risk and the output sample data.

Next, process 200 entails validating 208 the output sample data. For instance, the software application checks whether the sample size is sufficiently large. In some embodiments, the threshold sample size is 300 samples. A sample size of 300 or more reduces random noise and allows a reasonable estimate of the distribution tails. If the sample size is below the threshold, then process 200 entails instructing 210 the user to increase the sample size. For instance, an alert may be presented on the GUI for instructing 210 the user to increase the sample size.

Process 200 also entails receiving 212 Green Y values for B and W samples. B and W samples are two samples believed to fall within, respectively, BOB and WOW regions. The regions are explained later with reference to FIG. 5, but initially they represent tails of an estimated distribution. For instance, the software application receives, via the GUI, the B sample and the W sample. The B sample includes a first measured value of the output variable (i.e., the Green Y) representing a passing workpiece. And the B sample includes a second measured value of the test parameter (i.e., the Red X) associated with that pass. Likewise, the W sample includes a third measured value of the output variable representing a failing workpiece. And the W sample includes a fourth measured value of the test parameter associated with that failure.

Process 200 includes calculating 214 the output sample data to generate descriptive statistics. For instance, descriptive statistics include one or more of the following: a mean, median, maximum, minimum, standard deviation, and a distribution type. Calculating 214 may occur before either receiving 212 or selecting 206.

Next, processing 216 generally entails detection and verification of the estimated population distribution from the output sample data. For instance, processing 216 includes testing 218 (see, e.g., FIG. 3) for normality of the population from the output sample data for determining 220 whether it represents a normally distributed population.

If the data are not normally distributed, then processing 216 entails estimating 222 (see, e.g., FIG. 6) initial Weibull distribution parameters and testing 218 them (see, e.g., FIG. 7) for determining 224 whether a Weibull distributed population fits the output sample data. For instance, if the data are highly skewed (Weibull shape is less than or equal to one), then process 200 entails instructing 226 the user to resample the population or perform a non-parametric test. For example, the GUI could alert the user to perform a Spike B vs W or Barrier B vs C test instead.

If the output sample data is determined to be representative of a normal or Weibull distribution, then the estimated distribution is employed in performing 228 the B vs W two pack confirmation test. An embodiment of the test is described later with reference to FIG. 4. For instance, in some embodiments, the test entails determining bins of equal probability in the estimated distribution to define BOB and WOW regions based on the desired alpha risk, and determining whether the B sample falls in the BOB region and the W sample falls within the WOW region to indicate on the GUI that the parametric B vs W two pack confirmation test passed with the desired alpha risk.

Process 200 then entails presenting 230 the test results on a display screen providing the GUI. If the B sample falls in the BOB range, and the W sample falls in the WOW range, presenting 230 entails generating on the GUI a report that the test passed with the defined risk.

Figure 3:
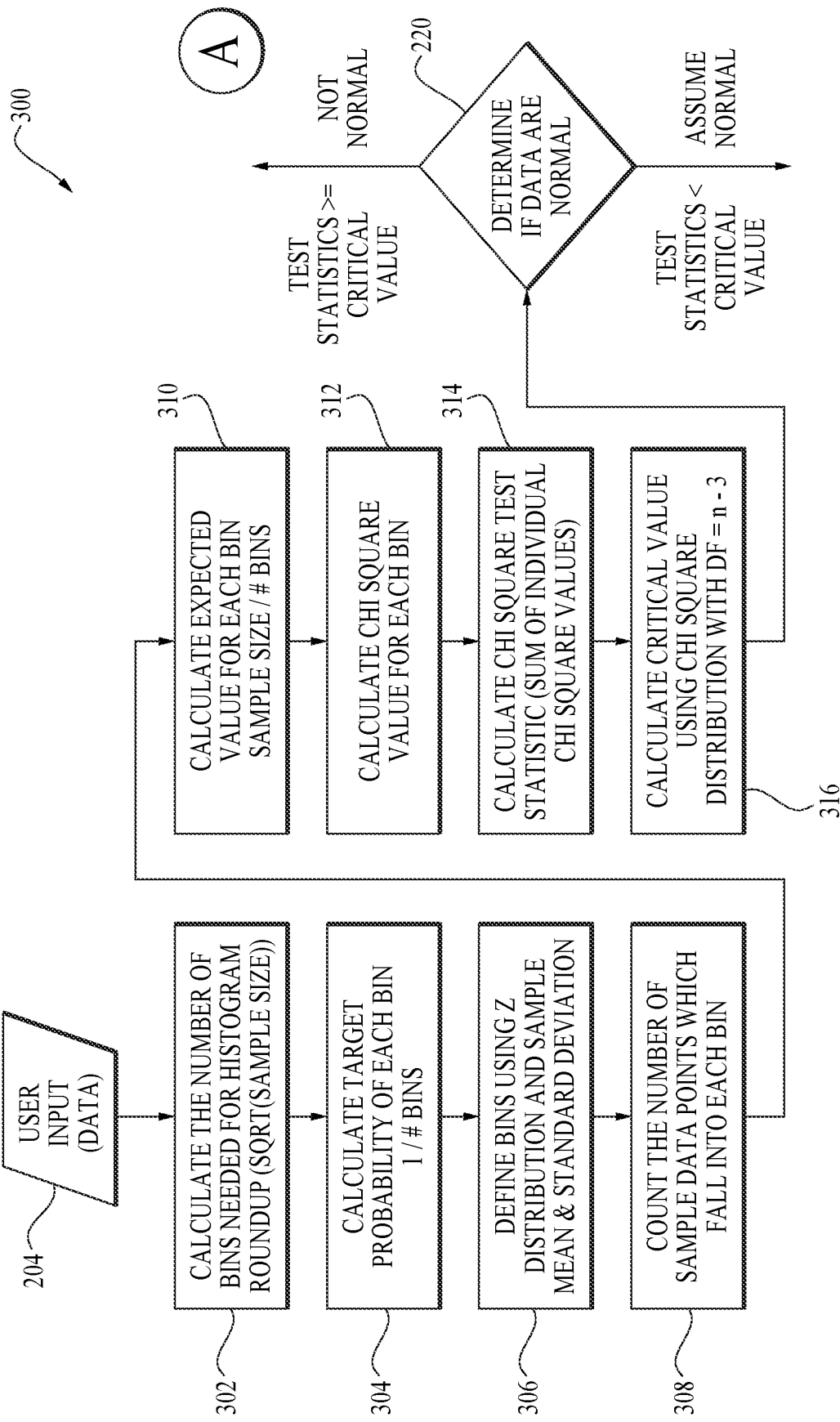
FIG. 3 is a flow chart of a process for testing normality of an estimated distribution, according to one embodiment.

FIG. 3 shows a process 300 for testing normality of an estimated distribution. In some embodiments, process 300 is provided for testing 218 (FIG. 2), as described previously.

Initially, process 300 receives the user input data previously uploaded 204 (FIG. 2). The user data includes output sample data, described previously.

Next, process 300 entails calculating 302 the number of bins needed for a histogram of the sample population. For example, the number of bins is equal to the square root of the sample size, rounded up to the nearest integer value, according to one embodiment.

Process 300 then entails calculating 304 a target probability of each bin. For instance, the target probability is equal to one divided by the number of bins, according to one embodiment.

Next, process 300 entails defining 306 bins using a Z distribution (e.g., a lookup table). For instance, the Z distribution provides threshold measured values for each bin based on the sample mean and standard deviation descriptive statistics determined in process 200 (i.e., step 214, FIG. 2), according to one embodiment.

Process 300 then entails counting 308 the number of sample data points falling into each bin. This counting 308 is straightforward based on the threshold measured values for each bin.

Process 300 next entails calculating 310 an expected value of samples for each bin. For example, calculating 310 is based on the sample size divided by the number of bins.

Next, process 300 entails calculating 312 chi squared values for each bin. Chi-square is a statistical test used to examine the differences between categorical variables from a random sample in order to judge goodness of fit between expected and observed results. The formula for the chi squared calculation is as follows:

$$\chi^2 = \sum \frac{(O_i - E_i)^2}{E_i}$$

where $O_i$ is an observed value and $E_i$ is an expected value. Because the basis of the test is equally probable bins, the expected value is simply the number of data points divided by the number of bins. And the observed value is obtained by counting the number of data points that fall into the given bin.

Process 300 next entails calculating 314 a chi square test statistic. For instance, the chi square test statistic is the sum of individual chi square values. The chi square test statistic is the value used to determine whether or not the chi square test is passed by comparing this value to the critical value required to pass the test.

In the next step, process 300 entails calculating 316 a critical value using the chi square distribution, with the degrees of freedom equal to n minus three. The value of "n" is the number of bins used in the chi square test.

Finally, process 300 entails determining 220 (see also, e.g., FIG. 2) whether the data are normal. If the test statistic from step 314 is greater than or equal to the critical value from step 316, then the data are not normal. If the test statistic is less, however, then the data is assumed to be normal.

Figure 4:
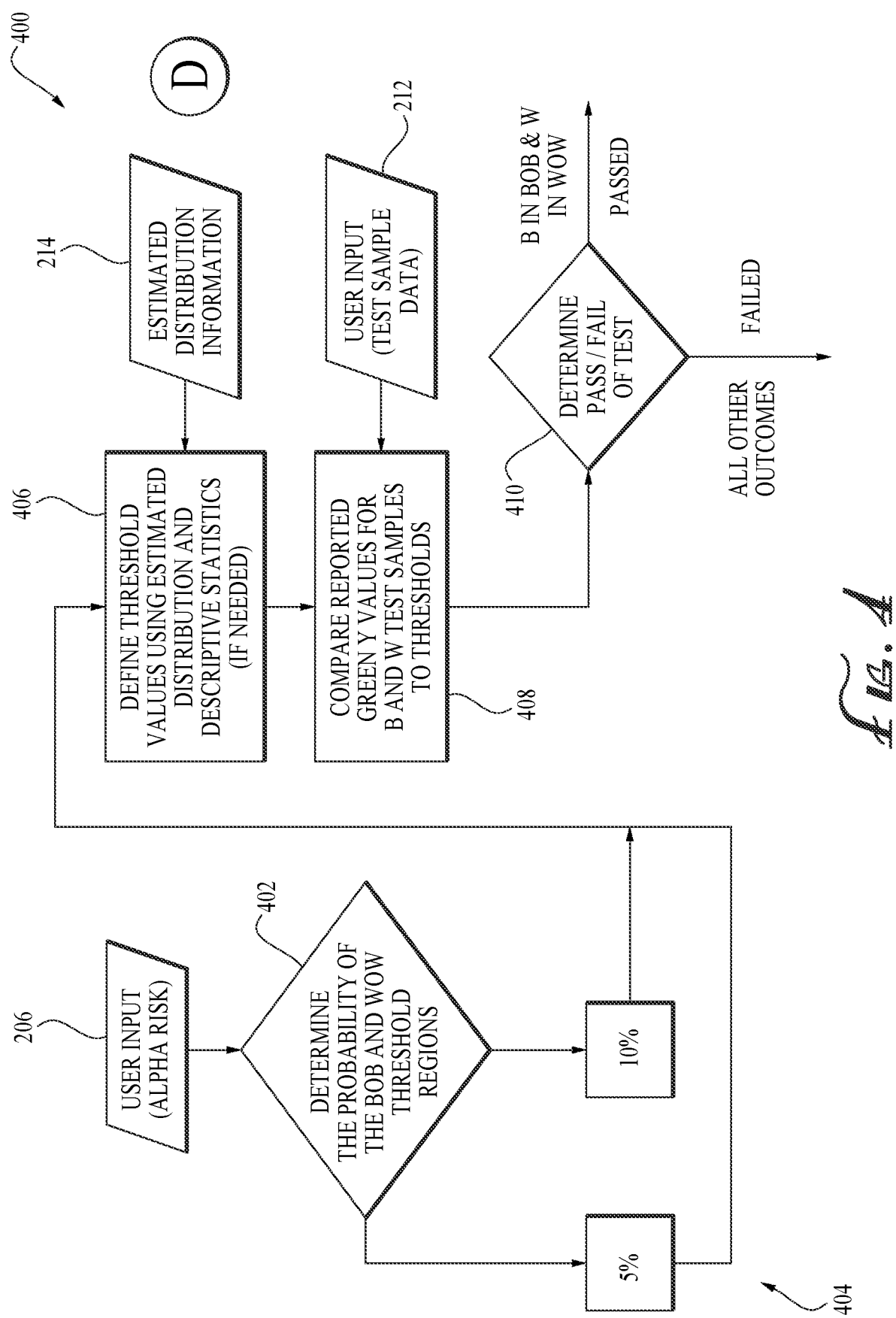
FIG. 4 is a flow chart of a process for performing the B vs W two pack confirmation test, according to one embodiment.

FIG. 4 shows a process 400 for performing the B vs W two pack confirmation test. In some embodiments, process 400 is provided for performing 228 (FIG. 2) the test, as described previously.

Initially, process 400 entails selecting 206 (FIG. 2) the desired alpha risk. For instance, the user may employ a GUI for selecting "1%," "5%," or another value for the desired alpha risk. The alpha risk is greater than or equal to probabilities of (A) one sample being in the WOW region and (B) another sample being in the BOB region:

alpha risk≥$P(A$ and $B)=P(A)*P(B)$

In general, the alpha risk for a confirmation test may be calculated by understanding the probability of a false positive. If the outcome of each event, or sample, used in the test is equally probable, then the combined probability of a specific result (in this case, the false positive result) is simply the product of the individual probabilities:

$$\text{Combined Probability} = \prod_{i=1}^{n} \text{probability}_{\text{individual event}}$$

Next, process 400 entails determining 402 equal probability bins for BOB and WOW threshold regions. An example of equal probability bins for BOB and WOW threshold regions is described later with reference to FIG. 5. The probability of these regions is a function of the selected alpha risk. For instance, if the desired alpha risk is 1%, then a bin size probability 404 is 10% (since alpha risk is 0.01, which is 0.1*0.1). Bin size probability 404 may be determined based on the following table, according to one embodiment.

| User Selected Alpha Risk for Test | Bin Probability (Size) |
|---|---|
| 1% | 10% |
| 5% | 20% |
| 10% | 30% |

Process 400 then entails defining 406 threshold values for BOB and WOW regions. In other words, measurable threshold values are determined for defining which samples fall within the BOB and WOW regions. These values are based on the estimated distribution (either normal or Weibull) from step 220 or step 224 (FIG. 2) and descriptive statistics from step 214 (FIG. 2).

Next, process 400 entails comparing 408 Green Y values for B and W test samples to the thresholds. The Green Y values are provided in step 212, as described previously.

Finally, process 400 includes determining 410 whether the confirmation test passes or fails. For instance, if the B sample is within the BOB region and the W sample is within the WOW region, then the test passes. Otherwise, the test fails.

Figure 5:
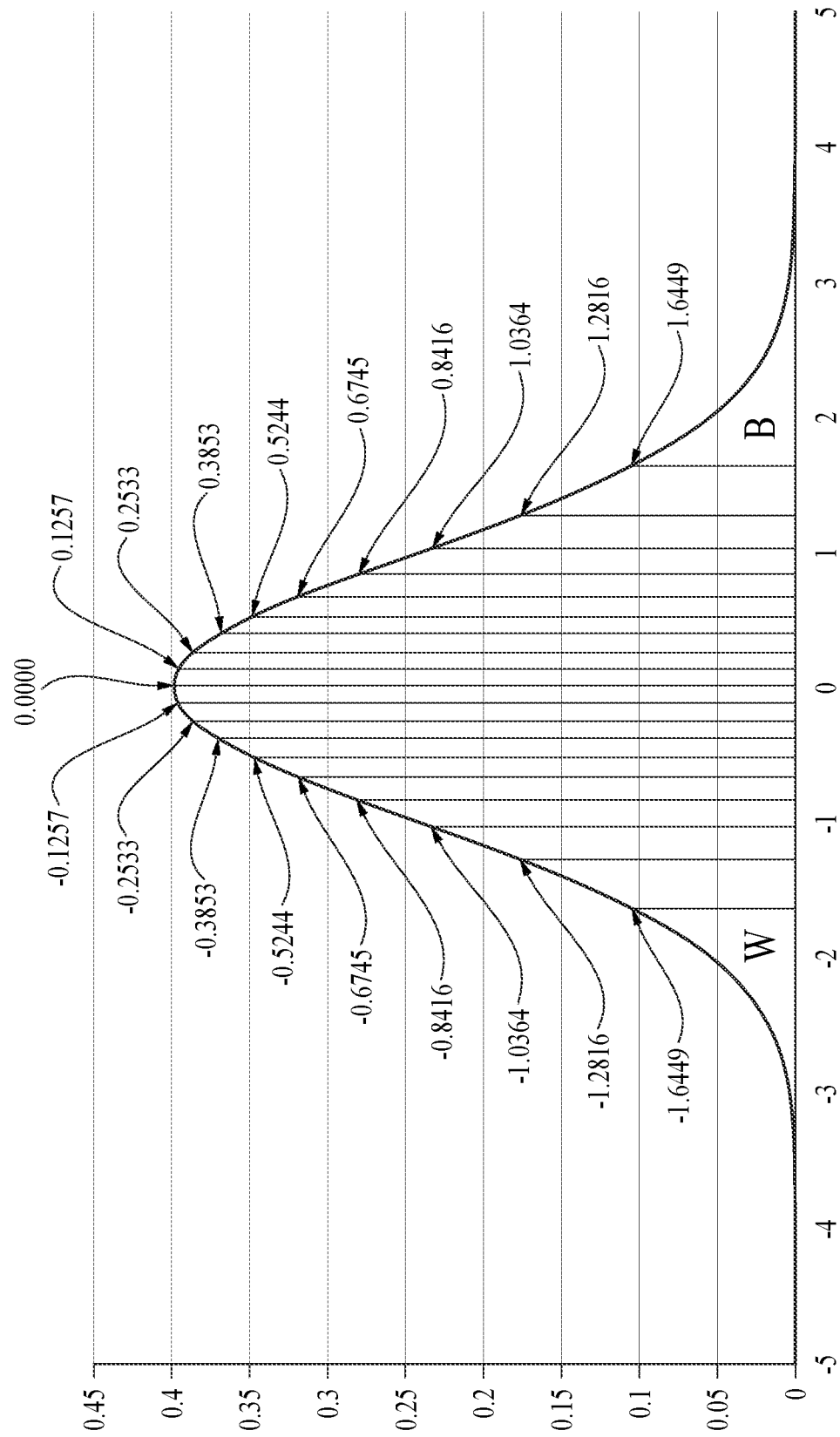
FIG. 5 is a graph of an estimated normal distribution showing best-of-best (BOB) and worst-of-worst (WOW) regions, according to one embodiment.

FIG. 5 illustrates the division of the standard normal population into 20 bins with equal area under the curve. This means that each bin has a probability of 5%. The "B" and "W" sections are the areas of interest for the B vs W two pack confirmation test.

Figure 6:
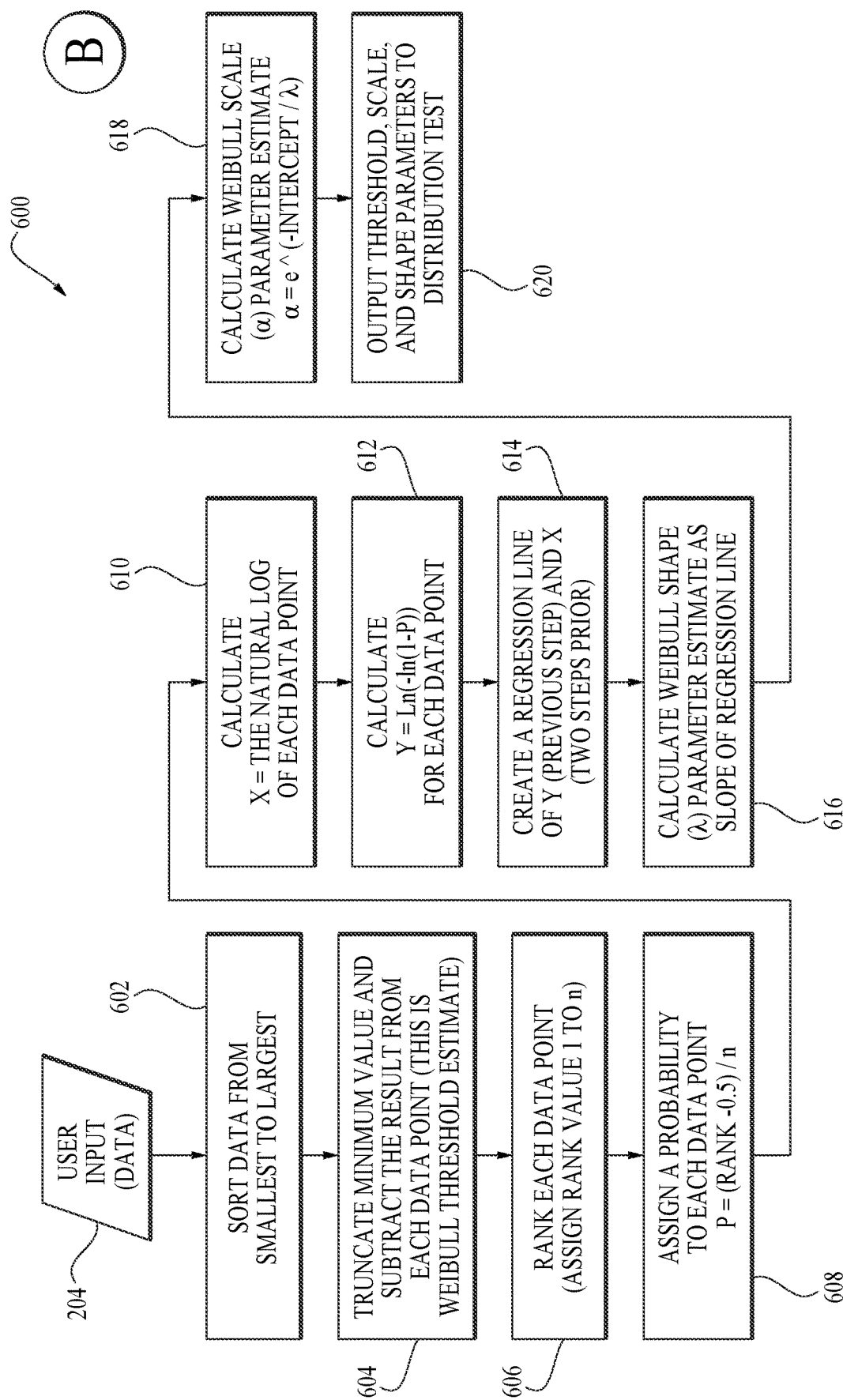
FIG. 6 is a flow chart of a process for estimating Weibull distribution parameters, according to one embodiment.

FIG. 6 shows a process 600 for estimating Weibull distribution parameters. In some embodiments, process 600 is provided for estimating 222 (FIG. 2) the Weibull distribution to fit the data, as described previously.

Initially, process 600 receives the user input data previously uploaded 204 (FIG. 2). The user data includes output sample data, as described previously.

Next, process 600 entails sorting 602 data from the smallest to largest and truncating 604 a minimum value and subtracting the result from each data point. This is the Weibull threshold estimate. By definition, Weibull is bounded at a minimum value of zero. For datasets which are far from zero, a threshold value is estimated. The threshold value is an offset from zero that is used to transform the data in order to calculate Weibull parameter estimates.

Process 600 then entails ranking 606 a measured value of each data point. For instance, each point is assigned a rank value from one to n. Process 600 then includes assigning 608 a probability to each data point, with the assigned probability P being equal to:

$$P = \frac{(\text{rank} - 0.5)}{n}$$

Process 600 then entails calculating 610 an independent variable (X) as a natural log of each data point.

$X=ln(\text{measured value})$

Likewise, process 600 entails calculating 612 a dependent variable (Y) as follows:

$Y=ln(-ln(1-P))$

Next, process 600 includes creating 614 a regression line of Y and X for calculating 616 a Weibull shape parameter (λ) estimate as a slope of the regression line. A following step entails calculating 618 a Weibull scale parameter (α) estimate as follows.

$\alpha=e^{(-intercept/\lambda)}$

"Intercept" is the value on the vertical axis where the value on the horizontal axis is zero.

Finally, process 600 entails outputting 620 the threshold, scale, and shape parameters for testing 232 (FIG. 2).

Figure 7:
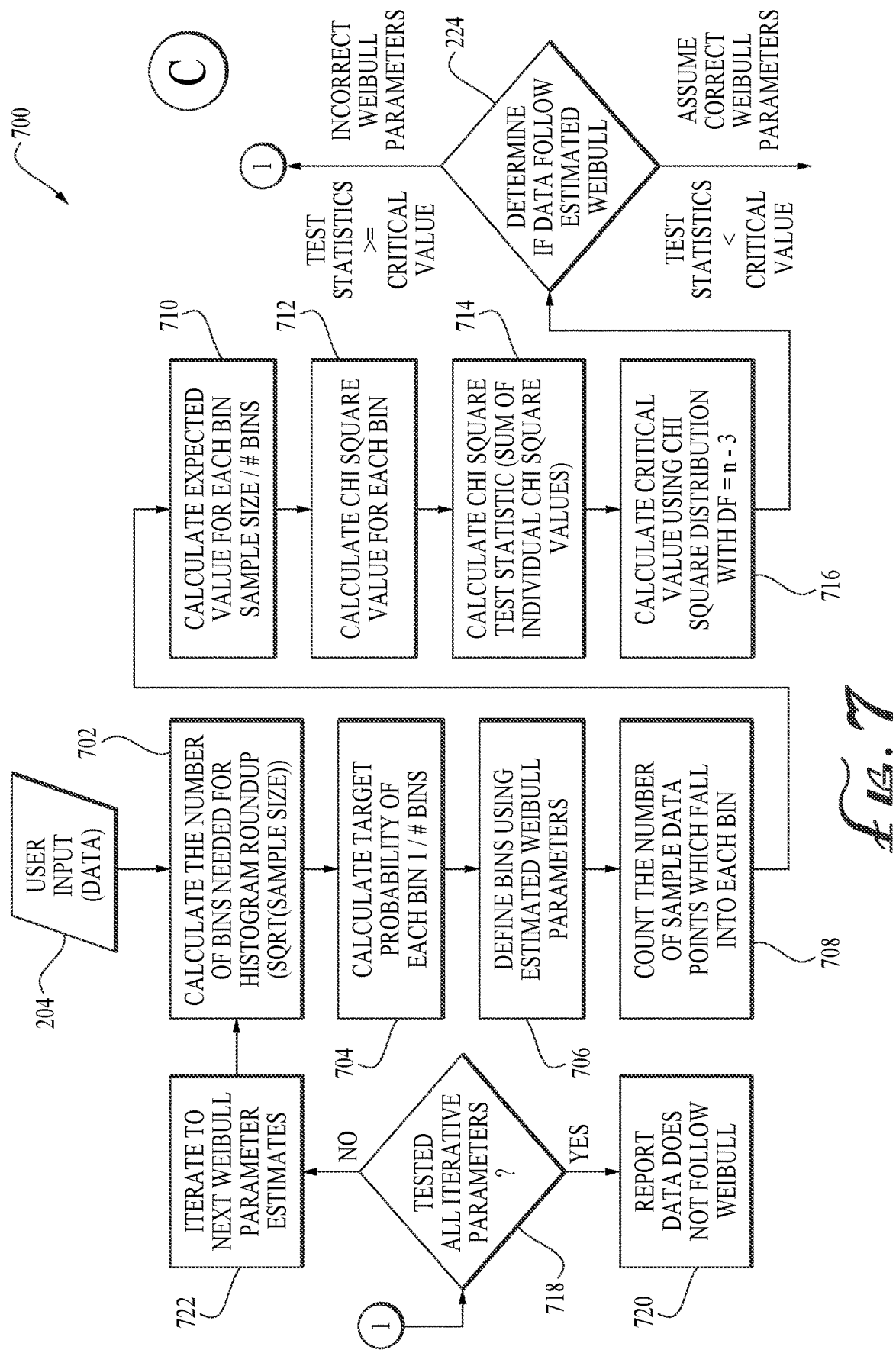
FIG. 7 is a flow chart of a process for testing the Weibull distribution parameters, according to one embodiment.

FIG. 7 shows a process 700 for testing the Weibull distribution parameters provided by process 600 (FIG. 6). In some embodiments, process 700 is provided for testing 232 (FIG. 2) the parameters, as described previously.

Initially, process 700 receives the user input data previously uploaded 204 (FIG. 2). The user data includes output sample data, as described previously. Also provided as inputs to process 700 are the initial estimates of Weibull shape and scale parameters.

Next, process 700 entails calculating 702 the number of bins needed for generating a histogram and calculating 704 target probability of each bin. These steps are similar to calculating 302 and 304 steps described previously with reference to FIG. 3.

Process 700 then entails defining 706 bins using the initial or iteratively estimated Weibull parameters. A bin value is calculated using the following equation.

$$BinValue_i = -\text{scale} \times \ln\left(1 - \left(\frac{1}{0.05 \times i}\right)\right)^{\left(\frac{1}{shape}\right)} + \text{threshold}$$

In the equation, i represents the bin number, ranging from 0 to 20, "scale" is the estimate of Weibull scale being evaluated, and "shape" is the estimate of Weibull shape being evaluated, and "threshold" is the threshold value used to offset the Weibull distribution. Iteration is described later with reference to FIG. 8-FIG. 10.

The next several steps of process 700 include counting 708, calculating 710, calculating 712, calculating 714, and calculating 716. These steps are similar to, respectively, counting 308, calculating 310, calculating 312, calculating 314, and calculating 316, as described previously with reference to FIG. 3.

Next, process 700 entails determining 224 whether the data follow the estimated Weibull distribution. If the test statistic from step 714 is greater than or equal to the critical value from step 716, then the data do not follow the estimated Weibull distribution. If the test statistic is less, however, then the data is assumed to follow the estimated Weibull distribution.

If the estimated Weibull parameters are incorrect, then process 700 includes checking 718 whether all iterative parameters (see e.g., FIG. 9) have been tested. If all the iterative parameters have been tested, then process 700 includes reporting 720 the data does not follow a Weibull distribution. If not all the iterative parameters are tested, then process 700 entails iterating 722 to the next Weibull parameter estimates and performing process 700 again.

Iterating 722 is a process by which the shape and scale parameters are incrementally changed to find the best estimate possible for the Weibull distribution of the data. If a passing result of the chi square test of any iteration is obtained, the process is terminated. The table below shows an example of the iteration steps.

| Iteration<br>0 (Original Estimate) | Scale Modification<br>0 (Original Estimate) | Shape Modification<br>0 (Original Estimate) |
|---|---|---|
| 1 | +0.00 | −0.05 |
| 2 | +0.50 | −0.05 |
| 3 | +0.50 | +0.00 |
| 4 | +0.50 | +0.05 |
| 5 | +0.00 | +0.05 |
| 6 | −0.50 | +0.05 |
| 7 | −0.50 | +0.00 |
| 8 | −0.50 | −0.05 |
| 9 | −0.50 | −0.10 |
| 10 | +0.00 | −0.10 |
| 11 | +0.50 | −0.10 |
| 12 | +1.00 | −0.10 |
| 13 | +1.00 | −0.05 |
| 14 | +1.00 | +0.00 |
| 15 | +1.00 | +0.05 |
| 16 | +1.00 | +0.10 |
| 17 | +0.5 | +0.10 |
| 18 | +0.00 | +0.10 |
| 19 | −0.50 | +0.10 |
| 20 | −1.00 | +0.10 |
| 21 | −1.00 | +0.05 |
| 22 | −1.00 | +0.00 |
| 23 | −1.00 | −0.05 |
| 24 | −1.00 | −0.10 |

Figure 8:
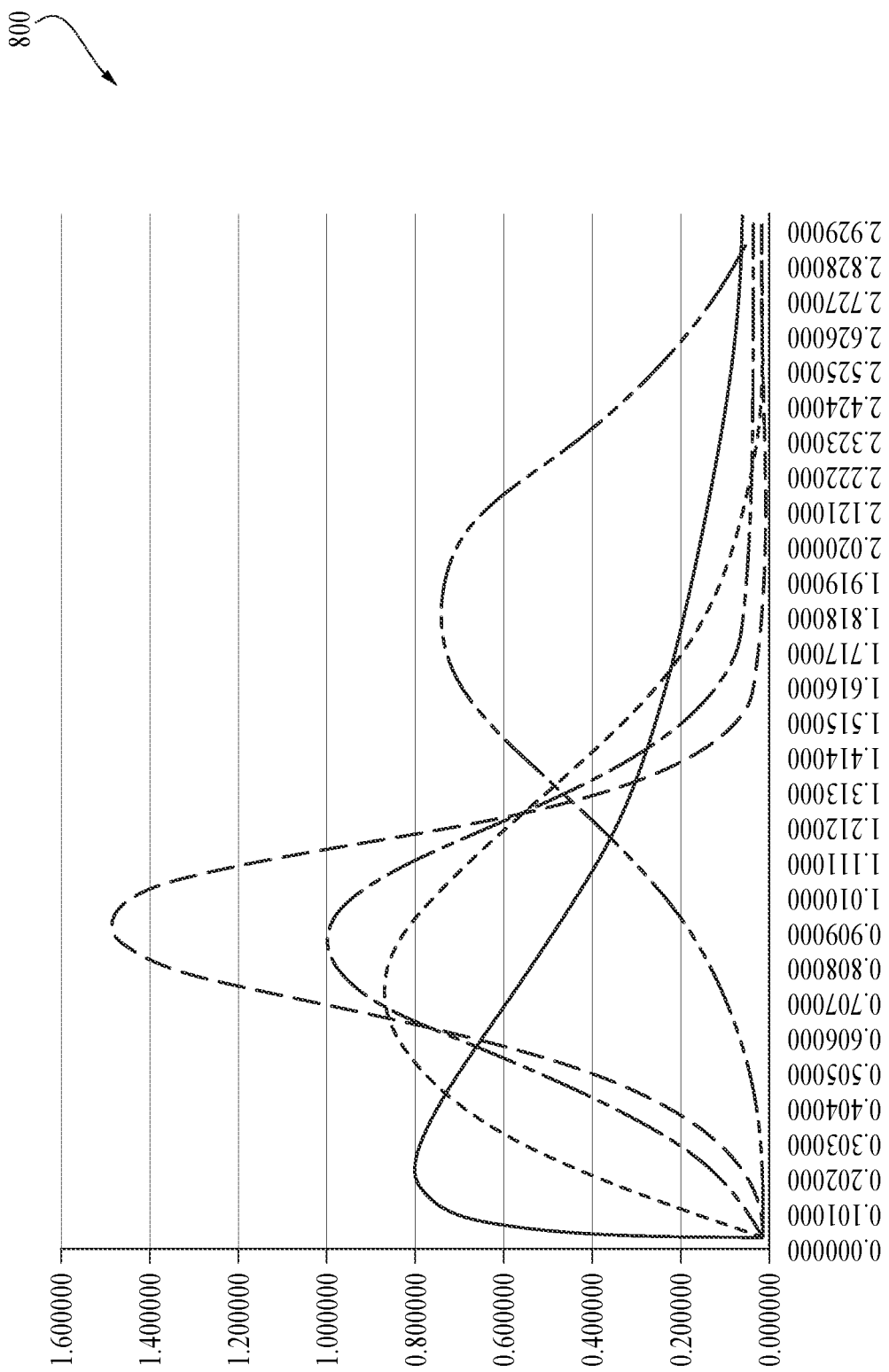
FIG. 8 is a graph showing Weibull distributions having different size and shape parameters, according to one embodiment.

FIG. 8 shows a set of Weibull distributions having different shapes and scales. By adjusting the shape, the X location of the peak and curvature of the distribution changes. Similarly, by adjusting the scale, the Y location of the peak changes along with the curvature.

Figure 9:
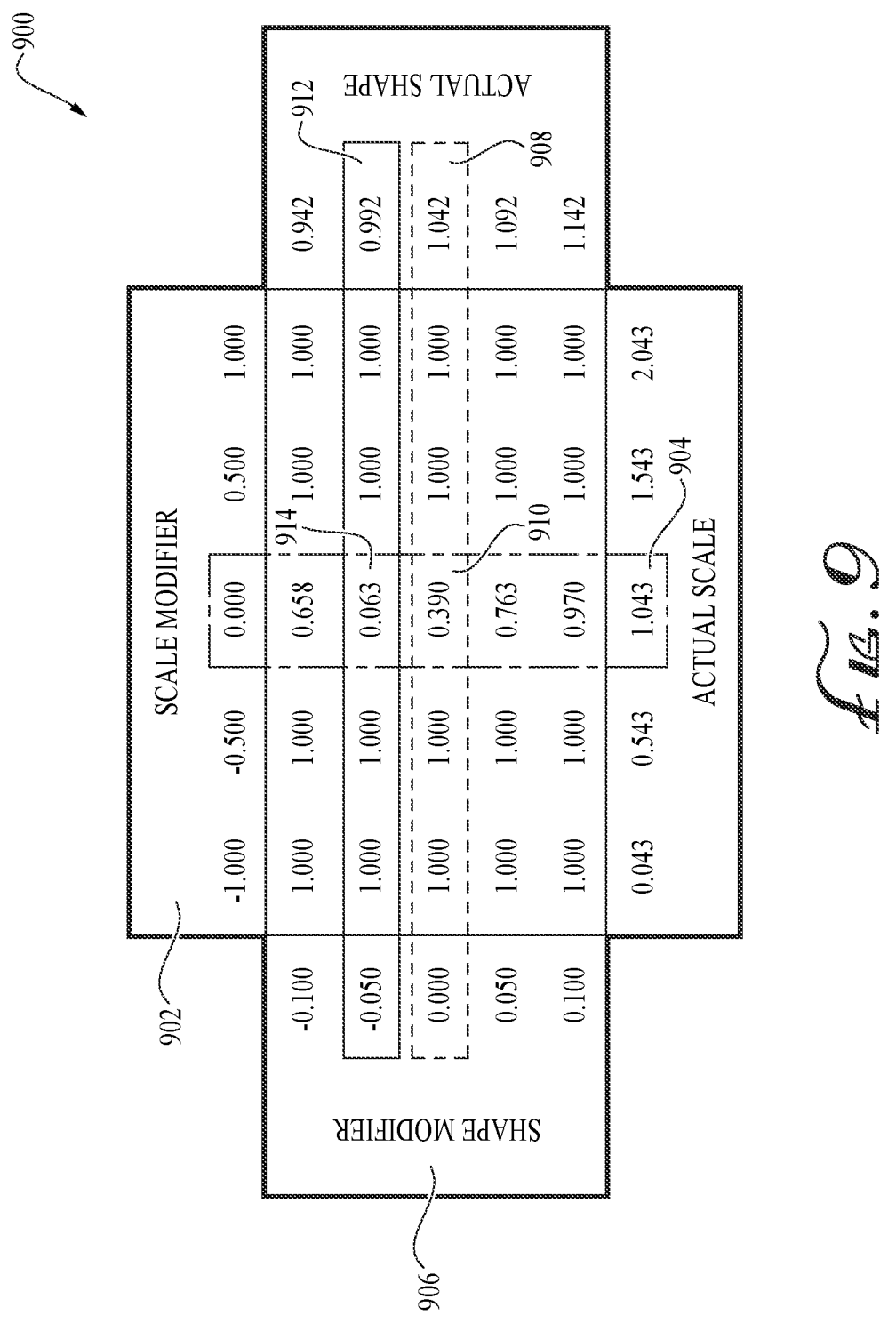

FIG. 9 shows a table 900 representing example of process 700 iterating through Weibull estimates using a scale modifier 902 for an initial actual scale value 904 and a shape modifier 906 for an initial actual shape value 908. Initial estimates are represented by a center cell 910 at an intersection of 0.000 scale and shape modifiers 902, 906. The value at center cell 910 (0.390) represents the p-value of the chi square test for the default Weibull shape and scale parameters which are calculated in the previous steps. The iteration done is to gradually modify the Weibull shape and scale estimates to look for a lower p-value and thus find the best fitting Weibull estimate of the population.

In this example, iterating through Weibull parameters means checking the other cells (shape estimates up to +/−0.100 in increments of 0.050, and scale estimates up to +/−1.000, in increments of 0.500), to find the best estimate possible. In this example, initial actual scale value 904 and an iterated actual shape value 912 result in the lowest value in a neighboring cell 914, which is found by calculating and comparing (i.e., iterating through) all the estimates in this table.

Figure 10:
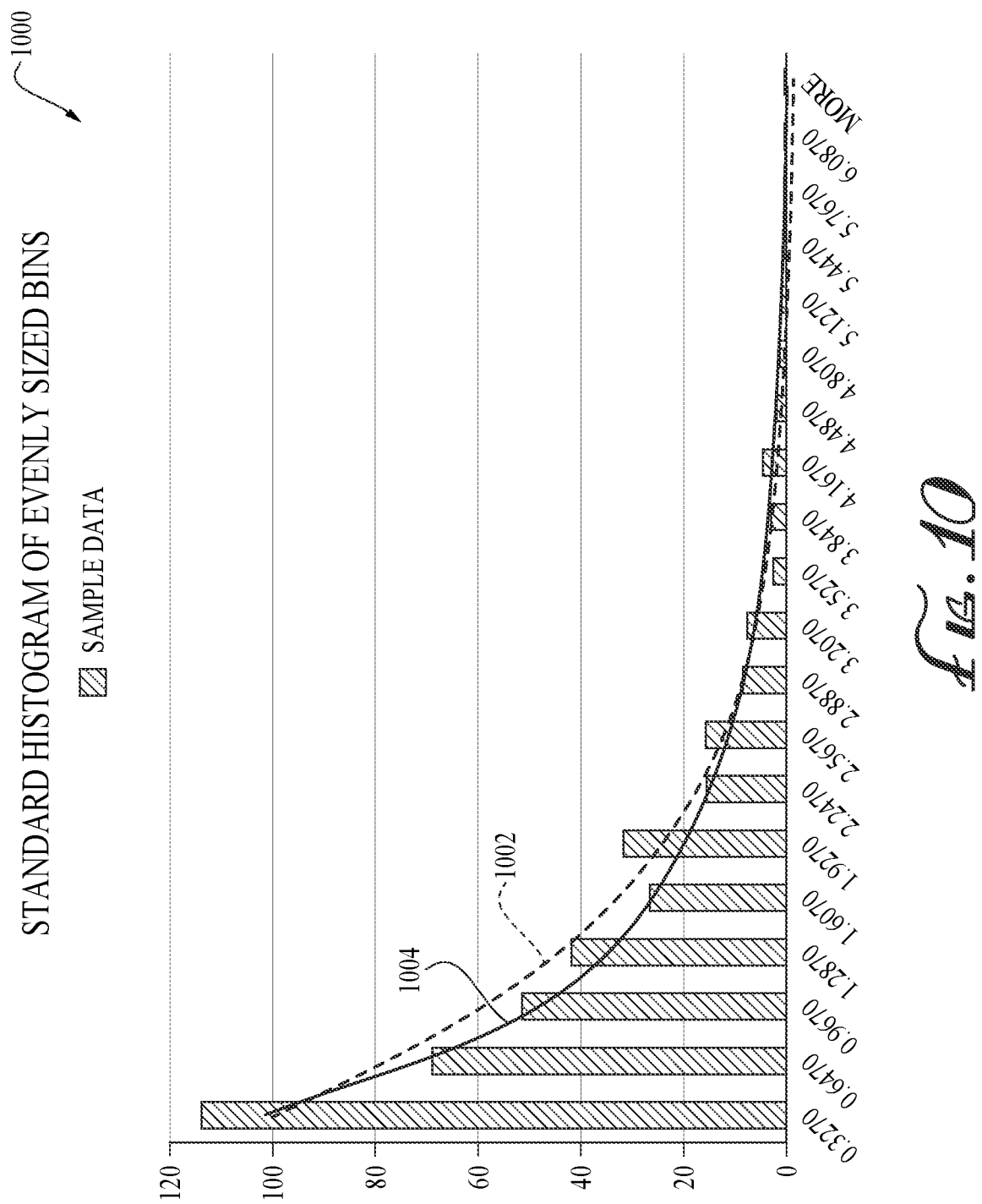
FIG. 10 is a histogram showing the iterated parameters from FIG. 9, according to one embodiment.

FIG. 10 shows histogram 1000 represented by table 900 (FIG. 9), in which an initial curve 1002 is represented by initial actual scale value 904, initial actual shape value 908, and center cell 910. An iterated curve 1004, which is a better fit for data of histogram 1000, is represented by initial actual scale value 904, iterated actual shape value 912, and neighboring cell 914.

FIG. 11-FIG. 16 show an example use case for the B vs W two pack confirmation test in confirming a root cause of non-cleanup (i.e., unmachined portion) of a critical surface after a final lapping (sanding) step.

Figure 11:
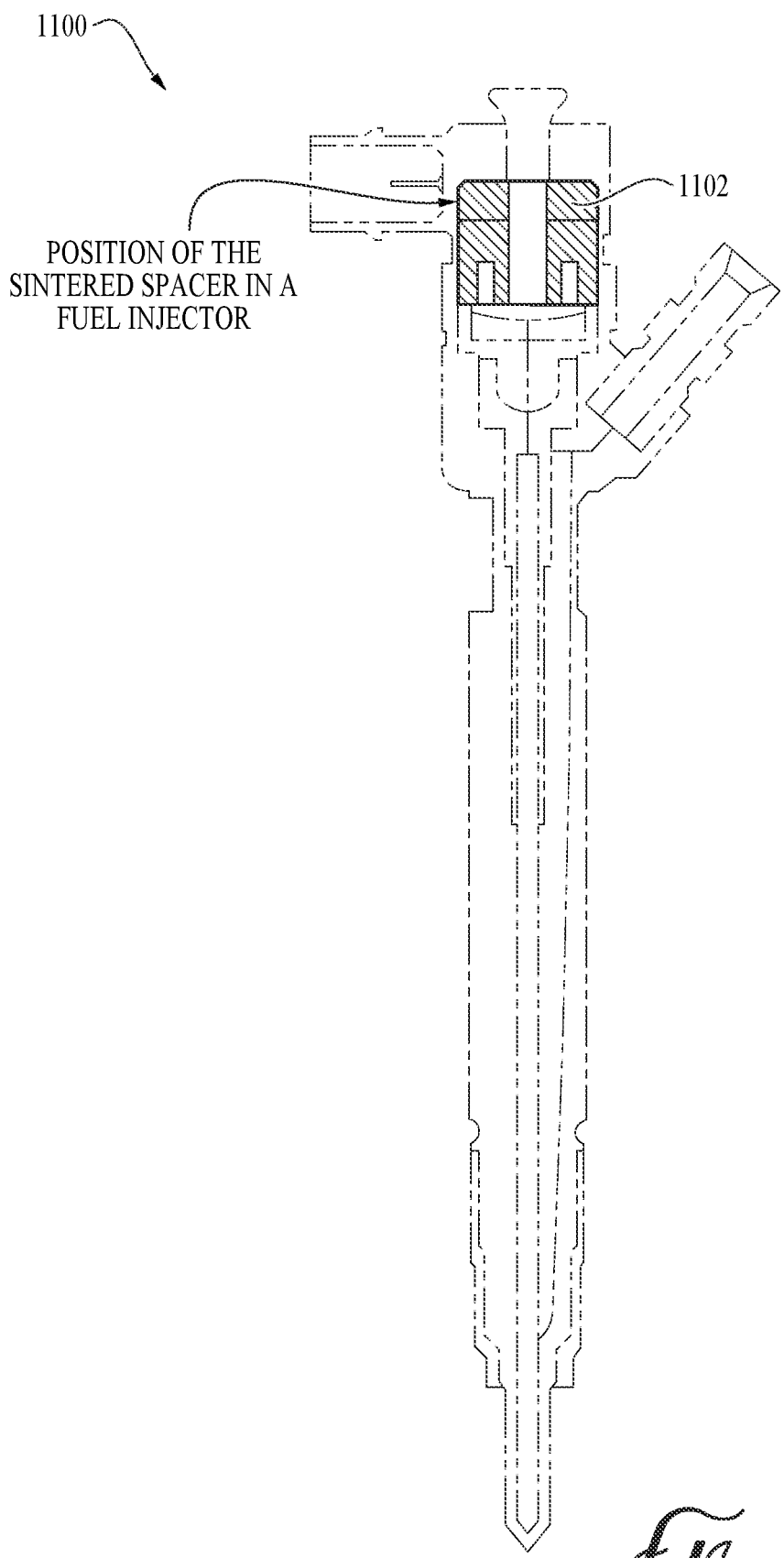
FIG. 11 is a cross section of a fuel injector showing a location of a sintered metal spacer, according to one embodiment.
Figure 12:
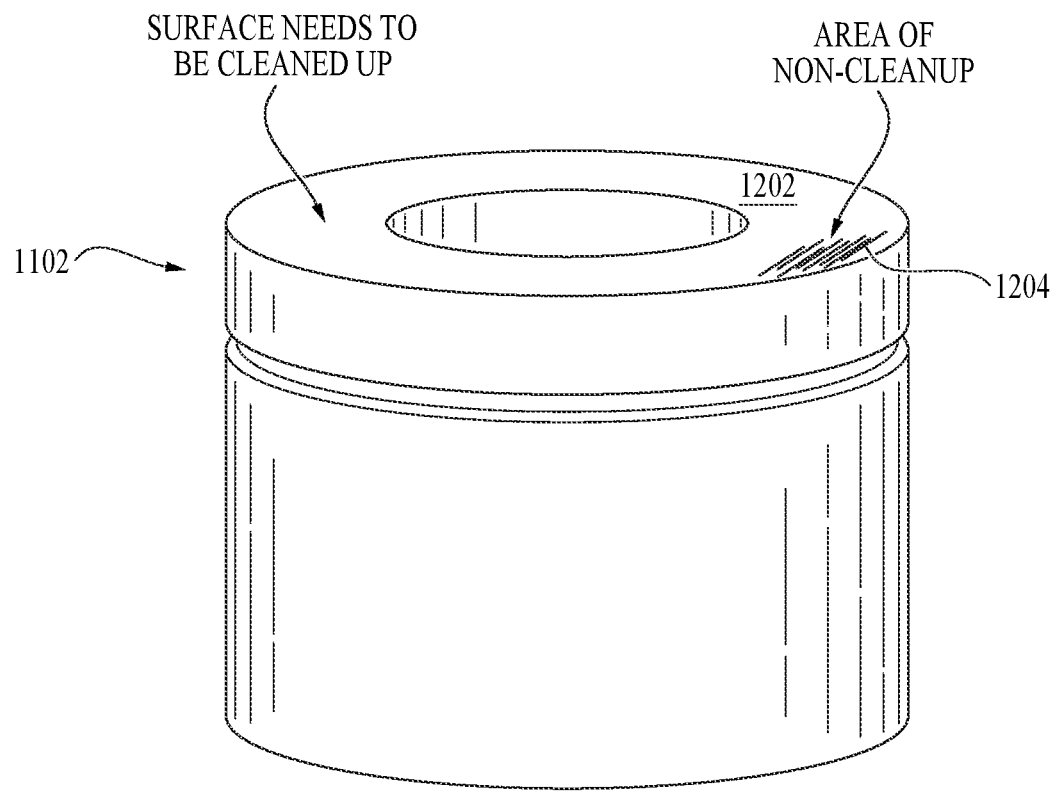
FIG. 12 is a perspective view of the spacer, according to one embodiment.

FIG. 11 initially shows a fuel injector 1100 having a sintered metal spacer 1102, which is shown enlarged in FIG. 12. As part of the production process, a surface 1202 is lapped. A problem, however, is that a rough area 1204 is not cleaned up after the final lapping (sanding) step.

Figure 13:
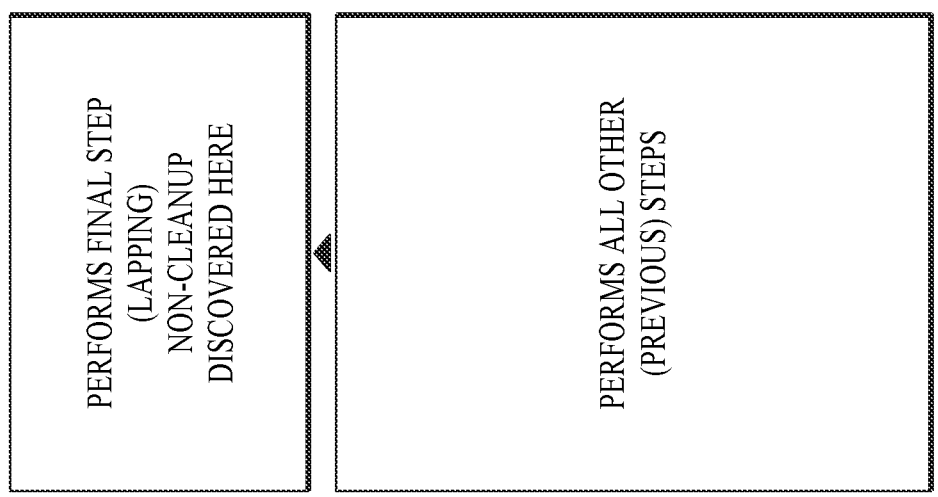
FIG. 13 is a block diagram showing production steps, according to one embodiment.

FIG. 13 shows that, in this example of sintered metal spacer 1102, lapping is performed by a different company that the manufacturer of the spacer has contracted to do the lapping step to help with delivery of the parts. The problem is observed to occur in batches (lots) of parts, with some lots having a high percentage of non-cleanup (Worst of Worst, or WOW lots) and others having almost complete cleanup (Best of Best, or BOB) lots.

To find the cause of the problem, the first stage of the investigation is to determine if the problem is caused by the lapping subcontractor or the part manufacturer. Because the failure occurs in batches, parts can be held back from several batches before sending them to the subcontractor. The subcontractor then lapped one mixed batch of parts (half from BOB lots, half from WOW). The BOB lot parts are cleaned up; the WOW lot parts are not. This means that the parts are predestined to clean up or not to clean up when they leave the part manufacturer, and the lapping process has no effect on which parts end up as BOB or WOW. Thus, the problem must reside with the part manufacturer.

Because non-cleanup is seen after the final step, the parts are measured at the part manufacturer's facility. Specifically, the parts are measured in terms of the profile of the face before and after lapping to look for possible correlation.

Profile is a measurement points in reference to some datum plane and is often used to describe the overall uniformity of a surface.

Figure 14:
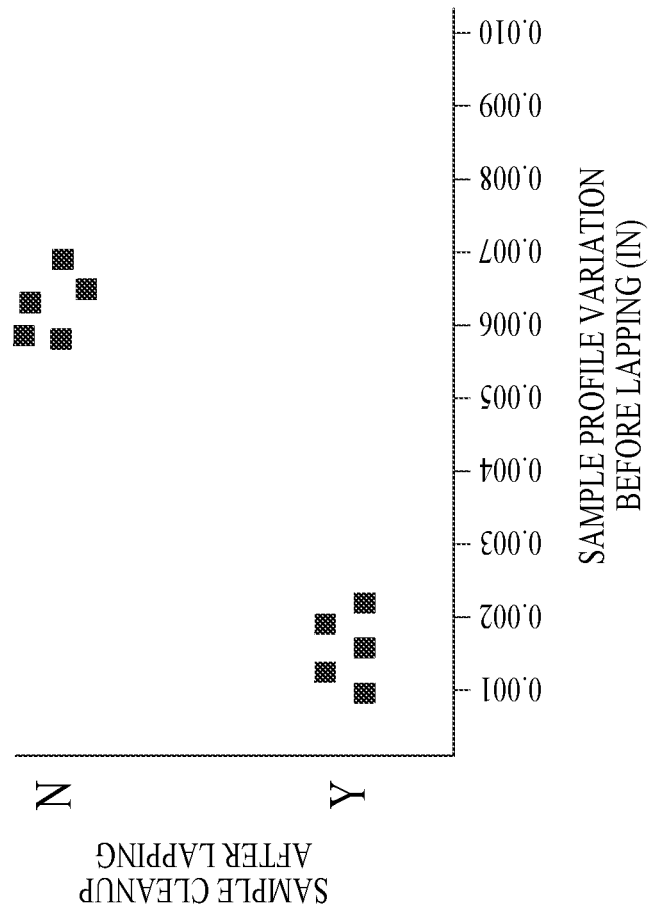
FIG. 14 is a scatter plot showing profile variation for spacers, according to one embodiment.

As shown in FIG. 14, parts with low profile variation clean up, whereas parts with high variation in profile do not. Thus, profile is a Green Y variable used to predict non-cleanup.

FIG. 15 shows that, using profile, the measure is taken before and after each step at the part manufacturer to find which step(s) cause the high variation in profile. Comparing profile before and after each step of the process shows that sintering causes the parts to have high variation in profile (i.e., uniform parts go in; high variation parts come out).

Figure 16:
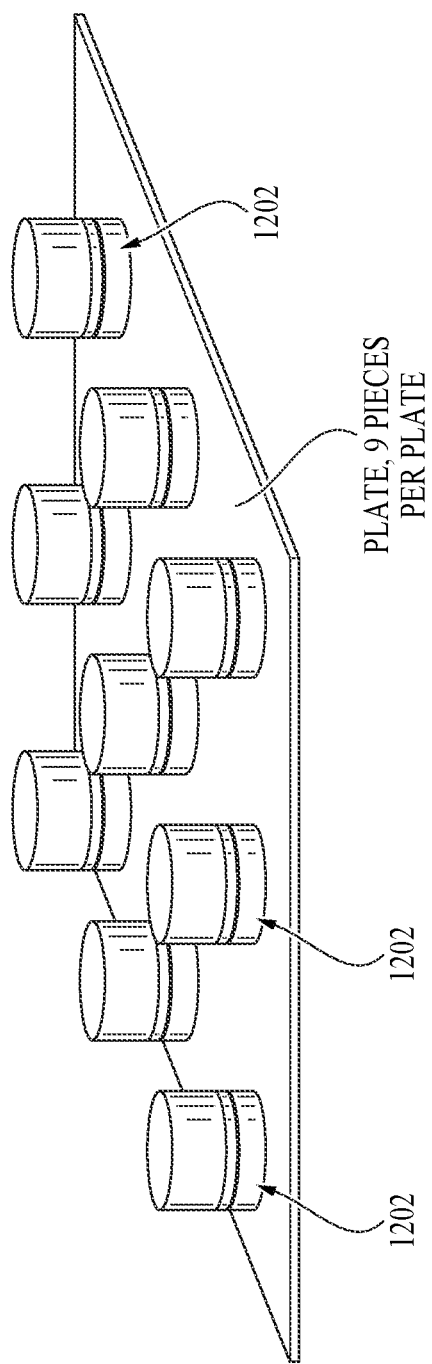
FIG. 16 is a cabinet projection view of spacers on a plate, according to one embodiment.

FIG. 16 shows an observation of the sintering process yielding possible causes. A likely cause is based on the observation that flatness of the plates upon which parts are placed when they go through the sintering oven contributes to the profile variation. Parts with large profile variation are from plates with high flatness (not very flat plates). Parts with low profile variation came from plates with low flatness (very flat plates).

Next, to determine if plate flatness is causing the profile issue or simply correlating with it, process 200 (FIG. 2) is performed to run the B vs W two pack confirmation test.

Figure 17:
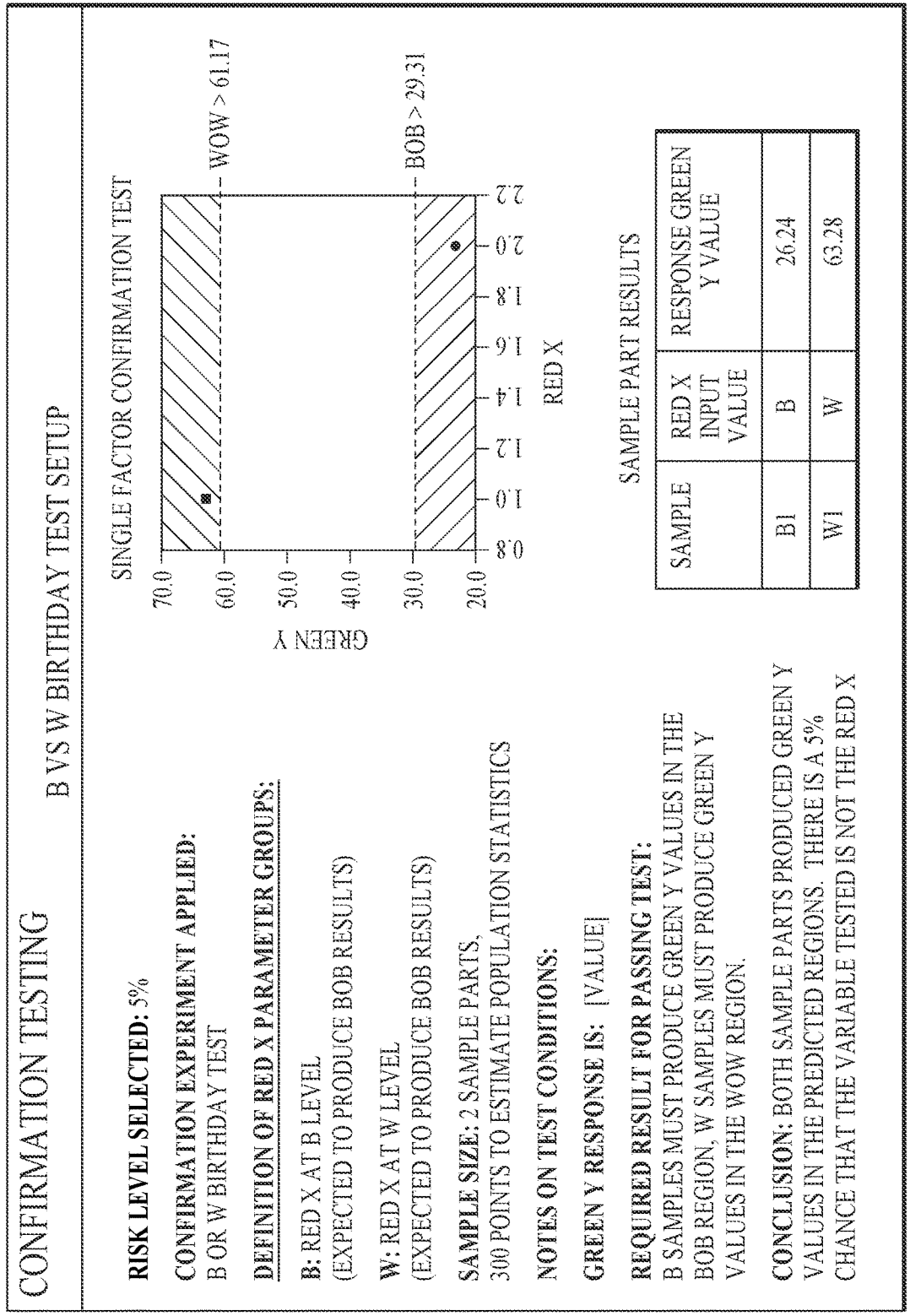
FIG. 17 is a GUI screenshot showing an overview of a software application for performing a B vs W two pack confirmation test, according to one embodiment.
Figure 19:
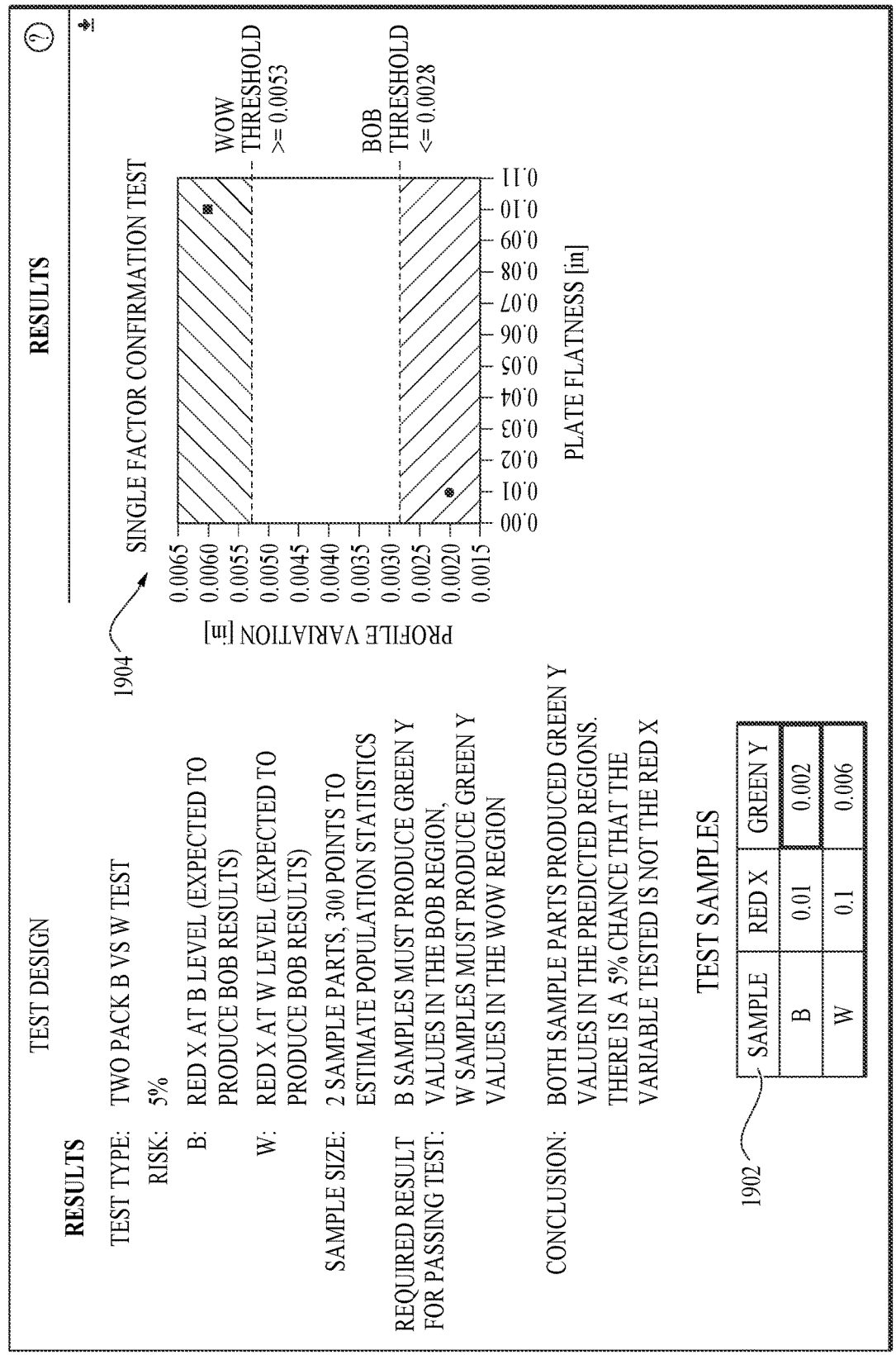
FIG. 19 is a GUI screenshot showing results of the B vs W two pack confirmation test, according to one embodiment.

FIG. 17-FIG. 19 show a GUI of a software application configured to facilitate any of the processes 200, 300, 400, 600, and 700 described previously. Specifically, FIG. 17 shows an overview screenshot introducing the B vs W two pack confirmation test. The screenshot may be presented by a smartphone application, a computer workstation application, a server providing a SaaS implementation for the processes, or any other form of computer application.

FIG. 18 shows a test configuration GUI 1800, which includes a test selection 1802, alpha risk selection 1804, a Red X binary or variable configuration option 1806 for selecting whether the Red X is binary or continuously variable, variable naming fields 1808, BOB and WOW location selection 1810, output sample data upload 1812, and descriptive statistics 1814. The data entry elements in some embodiments include combo boxes, text entry, radio buttons, or other data entry interfaces.

FIG. 19 shows a test result GUI 1900. B and W samples 1902 are provided and the results are displayed in a graphical format 1904.

FIG. 20 is a block diagram illustrating components 2000 configured to perform any of the processes 200, 300, 400, 600, and 700 described previously, according to some example embodiments. For example, components 2000 may comprise mobile smart device, a desktop computer, a remote server, or other commuting device.

Components 2000 are able to read instructions from a machine-readable or computer-readable medium (e.g., a non-transitory machine-readable storage medium). Specifically, FIG. 20 shows a diagrammatic representation of hardware resources 2002 including one or more processors 2004 (or processor cores), one or more memory/storage devices 2006, and one or more communication resources 2008, each of which may be communicatively coupled via a bus 2010. For embodiments where node virtualization (e.g., NFV) is utilized, a hypervisor 2012 may be executed to provide an execution environment for one or more network slices/sub-slices to utilize hardware resources 2002.

Processors 2004 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), another processor, or any suitable combination thereof) may include, for example, a processor 2014 and a processor 2016.

Memory/storage devices 2006 may include main memory, disk storage, or any suitable combination thereof. Memory/storage devices 2006 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 2008 may include interconnection or network interface components or other suitable devices to communicate with one or more peripheral devices 2018 or one or more databases 2020 via a network 2022. For example, communication resources 2008 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2024 may comprise software, a program, an application, an applet, an app, or other executable code for causing at least any of processors 2004 to perform any one or more of tasks discussed herein. Instructions 2024 may reside, completely or partially, within at least one of processors 2004 (e.g., within the processor's cache memory), memory/storage devices 2006, or any suitable combination thereof. Furthermore, any portion of instructions 2024 may be transferred to hardware resources 2002 from any combination of peripheral devices 2018 or databases 2020. Accordingly, memory of the processors 2004, memory/storage devices 2006, peripheral devices 2018, and databases 2020 are examples of computer-readable and machine-readable media.

In light of this disclosure, skilled persons will appreciate that many changes may be made to the details of the above-described embodiments without departing from the underlying principles of the invention. The scope of the present invention should, therefore, be determined only by claims and equivalents.

What is claimed is:

1. A method of improving a manufacturing process via a parametric B vs W two pack confirmation test for analyzing whether a testable parameter of a manufacturing process operation or a workpiece is a cause of an observable problem, the method comprising:
receiving, via a GUI, an indication of a desired alpha risk and a set of output sample data corresponding to a population of workpieces or manufacturing process operations associated with the observable problem, and each output sample in the output sample data having an associated measured value of an output variable that is representative of the observable problem;
processing, via a computer processor, the output sample data to generate an estimated distribution of the output variable for the population of workpieces or manufacturing process operations;
determining, via the computer processor, bins of equal probability in the estimated distribution to define best-of-best (BOB) and worst-of-worst (WOW) regions based on the desired alpha risk;
receiving, via the GUI, a first measured value of the output variable of a B sample of the workpiece or manufacturing process having the parameter at a first parameter value that is predicted to result in the output variable falling within the BOB region, and a second measured value of the output variable of a W sample of the workpiece or manufacturing process having the parameter at a second parameter value that is predicted to result in the output variable falling within the WOW region; and determining whether the first measured value of the output variable of the B sample falls in the BOB region and the second measured value of the output variable of the W sample falls within the WOW region to indicate on the GUI that the parametric B vs W two pack confirmation test passed with the desired alpha risk, thereby identifying the parameter as a cause of the observable problem;

controlling the parameter to reduce the incidence of the observable problem caused by the workpiece or manufacturing process.

2. The method of claim 1, further comprising determining whether the output sample data represents a normally distributed population based on equally probable bins for chi square goodness of fit test.

3. The method of claim 2, in which, in response to determining the output sample data does not represent the normally distributed population, the method further comprises determining whether the output sample data represents a Weibull distributed population based on estimated Weibull distribution parameters.

4. The method of claim 3, further comprising iterating the estimated Weibull distribution parameters.

5. The method of claim 1, in which the BOB and WOW regions are defined based on threshold values corresponding to bins at tails of the estimated distribution.

6. The method of claim 1, further comprising calculating, via the computer processor, descriptive statistics of the estimated distribution to determine the threshold values.

7. The method of claim 1, further comprising receiving, via the GUI, an indication that the BOB region corresponds to a low value of the output variable.

8. The method of claim 1, further comprising receiving, via the GUI, an indication that the testable parameter is a binary parameter.

9. The method of claim 1, further comprising receiving, via the GUI, an indication that the testable parameter is a variable parameter.

* * * * *